T. A. DECKER.
FOOD OR CONDIMENT HOLDER.
APPLICATION FILED SEPT. 7, 1911.
1,038,098.
Patented Sept. 10, 1912.
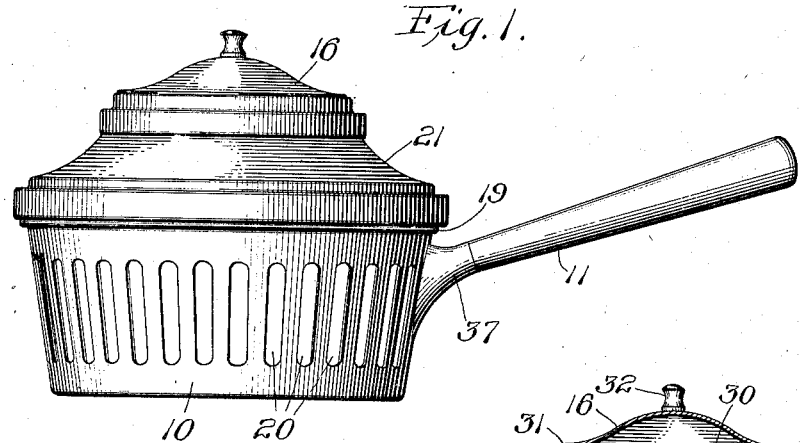
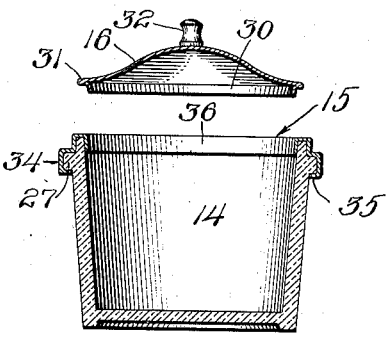
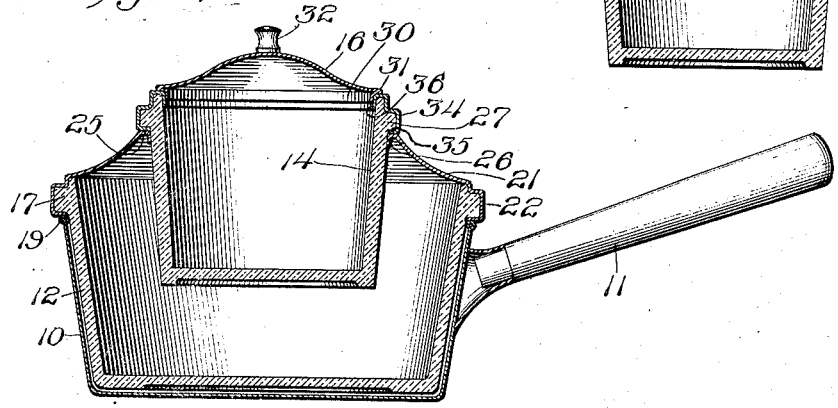
Witnesses:
Harry S. Gaither
J. E. Dowle.
Inventor:
Theodore A. Decker
By William L. Hall, Att'y.

UNITED STATES PATENT OFFICE.

THEODORE A. DECKER, OF CHICAGO, ILLINOIS.

FOOD OR CONDIMENT HOLDER.

1,038,098.   Specification of Letters Patent.   Patented Sept. 10, 1912.

Application filed September 7, 1911. Serial No. 648,083.

*To all whom it may concern:*

Be it known that I, THEODORE A. DECKER, a citizen of the United States, and a resident of Chicago, in the county of Cook and State of Illinois, have invented certain new and useful Improvements in Food or Condiment Holders; and I do hereby declare that the following is a full, clear, and exact description thereof, reference being had to the accompanying drawings, and to the characters of reference marked thereon, which form a part of this specification.

This invention relates to a novel condiment or food container, adapted for use at the table for serving a food, a condiment or the like where it is desired to maintain the same at a predetermined or uniform temperature, either hot or cold.

Among the objects of the invention is to provide a device for this purpose, which may be economically made, which is easily and readily manipulated in use, and the parts of which are so arranged that the device may be readily taken apart for purpose of cleaning said parts.

The invention consists in the matters hereafter set forth, and more particularly pointed out in the appended claims.

In the drawings, Figure 1, is a side elevation of a device, embodying my invention. Fig. 2, is a central vertical section thereof, with parts in elevation. Fig. 3, is a central vertical section of the container and its cover, the latter being shown as separated from the open top of the container.

As shown in the drawings, 10 designates a hollow, upwardly opening frame or holder, which may be made of metal, and may be provided with a suitable handle, 11. 12 designates an open topped receptacle supported in the holder, said receptacle being adapted to receive a thermal medium, such as ice, or a heated liquid, and 14 designates an open topped jar or container for the food material or condiment, which container extends into and is supported by and within the open topped receptacle 12. Said container is provided with a top opening 15, which is closed by a cap or cover 16. The said receptacle 12, for the thermal medium may be made principally of glass, and is provided near its upper open end with an external shoulder 17, to overlap the upper margin of the holder 10, around the top opening of the latter, whereby the receptacle is supported in said holder. Said holder 10, is preferably made of sheet metal, and its upper margin is folded or beaded as shown at 19 to stiffen said margin, and to give proper support for receptacle 12. The receptacle 12 closely fits the holder, both being shown as tapered downwardly and inwardly from their upper open sides. The said holder may be provided with the elongated openings 20, to give an attractive appearance thereto, and to suitably lighten the holder. The upper wall of said receptacle 12, is made of metal and is preferably of general conical shape. It is formed with a central opening. The lower or outer margin of said metal upper wall of the receptacle 12, is spun around the shoulder 17 thereof, as shown at 22, to fixedly attach said upper wall to the glass portion of the receptacle, and to form an air and liquid tight joint between the two parts of the receptacle. The margin of the top wall 21, surrounding the central opening therein, is flanged inwardly to provide a seat 25 sufficiently wide to support the container or jar 14, and also to stiffen said wall; and said wall may be further stiffened by the downwardly turned flange 26, shown in Fig. 2. Said flange 26, closely fits about the container when the latter is in place.

The food or condiment container or jar 14, may be made of glass, and is provided around its open top with an external shoulder 27 to overlap the seat 25, at the margin of the opening in the conical wall 21 of said receptacle, whereby the jar is supported in place. The cap or cover 16, is provided with a downwardly extending flange 30, which fits closely within the open top of the jar or container 14, and with a horizontally extended flange 31, that overlaps the upper margin of said jar or container. Said cap is preferably provided with a centrally located knob, or hand piece 32 by which to manipulate the same.

The holder, receptacle and container are shown, and preferably will be made, of circular cross-section, this cross-section being a most advantageous one with respect to the manufacture of the device and to the assembling of the device to produce and maintain the sealed joints hereinafter described.

In order to provide a sealed joint between the conical top wall 21, of the receptacle 12, and the container 14, and also a sealed joint between the container 14, and the cap or cover 16, the shoulder 27 of the upper margin of said container is covered by a metal sealing ring 34, which is spun or otherwise formed about said parts, and is made of such cross-section as to inclose the same. The said sealing ring as shown in Figs. 2 and 3 lies outside of and covers the shoulder 27, with its lower margin 35 spun or formed under said shoulder, and with its intermediate portion formed over the lateral and upper sides of said shoulder. The upper margin of said sealing ring 34, is folded over the top margin of the container 14, and is turned downwardly, as shown at 36, inside the container. The lower margin 35 of said sealing ring engages the metal flanged seat 25 of the top wall 21 of the receptacle 12, and said parts are made to fit with a close joint for the purposes described. The upper marginal portion of said sealing ring fitting, as it does, over the top margin of the holder and inside thereof, provides seating faces to engage the flange members 31 and 30 of the cap or cover to afford sealed or air and liquid tight joints between these parts.

The handle 11, which may be made of wood, is inserted into a fitting 37, of the shape shown in Figs. 1 and 2, which latter fitting is soldered or otherwise secured to holder 10.

In the use of the device, the receptacle 12 is placed in the holder, either before or after the thermal medium, as ice or a heated liquid, is placed in said receptacle. Thereafter the container 14, charged with the food material or condiment to be dispensed, is placed into receptacle 12 until arrested by the engagement of the shoulder portion thereof with the seat 25 of the top wall of the receptacle. The container, thus supported, is suspended in the receptacle and is invested by the thermal medium which fills the receptacle 12, so that the contents of the container 14 may be maintained at a substantially uniform temperature for a long period of time. Such maintenance of the temperature is promoted by the fact that closed or sealed joints are formed between the container and the top wall of the receptacle and also between the container and its cap.

The device is economical to construct, is neat in appearance, and is capable of being readily taken apart for the purpose of cleaning the same, so that it may be readily kept in a sanitary condition.

I claim as my invention:

1. A device for the purpose set forth comprising an open-topped holder, a receptacle for a thermal medium removably fitted within said holder and provided at its top with an external, downwardly facing shoulder, through the medium of which it is supported on the margin of the holder, said receptacle having a metal top wall, the outer margin of which is folded about said shoulder to provide a fluid tight joint, and provided also with a central flanged opening surrounded by a seat, an open topped container fitted within said flanged opening and extending downwardly into said receptacle, and having an external, downwardly facing shoulder to engage said seat, a removable cover fitted over and closing the top of the container, and means whereby is afforded a sealed joint between the shoulder of said container and said seat and also between the open top of the container and said cover.

2. A device for the purpose set forth comprising a suitable holder, a receptacle for a thermal medium removably supported therein and having a metal top wall which is attached to the upper margin of the receptacle body by means providing a fluid tight joint, the said top wall being provided with a central opening, and around said opening with a horizontal seat, an open topped container provided with a removable cover, and provided also with an external, downwardly facing shoulder to engage said seat, whereby the container may be removably suspended within the receptacle and supported by said seat, and a sealing ring formed about said shoulder and the open top of the container for engagement with said seat and said removable cover, said metal top wall of the receptacle being provided radially within said seat with an annular depending flange which closely surrounds said container to provide a tight joint between the container and said flange.

In testimony that I claim the foregoing as my invention I affix my signature in the presence of two witnesses, this 15th day of August A. D. 1911.

THEODORE A. DECKER.

Witnesses:
  W. L. HALL,
  G. E. DOWLE.